(12) United States Patent
Malkin

(10) Patent No.: US 8,429,274 B2
(45) Date of Patent: Apr. 23, 2013

(54) STORAGE RESOURCE SCAN

(75) Inventor: Kirill Malkin, Morris Plains, NJ (US)

(73) Assignee: RELDATA, Inc., Parsippany, NJ (US)

( * ) Notice: Subject to any disclaimer, the term of this patent is extended or adjusted under 35 U.S.C. 154(b) by 1070 days.

(21) Appl. No.: 11/470,551

(22) Filed: Sep. 6, 2006

(65) Prior Publication Data

US 2007/0055645 A1    Mar. 8, 2007

Related U.S. Application Data

(60) Provisional application No. 60/714,408, filed on Sep. 6, 2005.

(51) Int. Cl.
*G06F 15/173* (2006.01)
(52) U.S. Cl.
USPC ............ 709/226; 709/223; 709/224; 707/822
(58) Field of Classification Search .......... 709/223–226; 707/205
See application file for complete search history.

(56) References Cited

U.S. PATENT DOCUMENTS

| 5,870,757 A * | 2/1999 | Fuller .................................. 1/1 |
| 7,177,935 B2 * | 2/2007 | Bradshaw et al. ............. 709/226 |
| 7,340,578 B1 * | 3/2008 | Khanzode ..................... 711/170 |
| 7,401,089 B2 * | 7/2008 | Benton et al. ......................... 1/1 |
| 2004/0078461 A1 * | 4/2004 | Bendich et al. ............... 709/224 |
| 2004/0139176 A1 * | 7/2004 | Farrell et al. .................. 709/220 |

* cited by examiner

*Primary Examiner* — Mohamed Ibrahim
(74) *Attorney, Agent, or Firm* — Heslin Rothenberg Farley & Mesiti P.C.

(57) ABSTRACT

Various information about storage resources in a UNIX or UNIX derivative operating system computing environment is gathered from various sources in response to scan requests. Where a given type of information for a given storage resource is gathered from multiple sources, the information is verified for consistency, and placed in a single file in an industry standard hierarchical format. Scan threads are timed to provide reliable performance.

24 Claims, 3 Drawing Sheets

STORAGE RESOURCE SCAN

CROSS-REFERENCE TO RELATED APPLICATIONS

This application claims priority under 35 U.S.C. §119 to U.S. Provisional Application No. 60/714,408, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,550, by Malkin et al., entitled "REDUNDANT APPLIANCE CONFIGURATION REPOSITORY IN STANDARD HIERARCHICAL FORMAT".

U.S. patent application Ser. No. 11/470,548, now U.S. Pat. No. 7,676,682, issued on Mar. 9, 2010, by Malkin et al., entitled "LIGHTWEIGHT MANAGEMENT AND HIGH AVAILABILITY CONTROLLER".

U.S. patent application Ser. No. 11/470,545, by Kirill Malkin, entitled "BLOCK SNAPSHOTS OF iSCSI".

U.S. patent application Ser. No. 11/470,544, by Kirill Malkin, entitled "GENERATING DIGEST FOR BLOCK RANGE VIA iSCSI".

U.S. patent application Ser. No. 11/470,542, by Kirill Malkin, entitled "INCREMENTAL REPLICATION USING SNAPSHOTS".

U.S. patent application Ser. No. 11/470,537, now U.S. Pat. No. 7,512,756, issued on Mar. 31, 2009, by Kirill Malkin, entitled "PERFORMANCE IMPROVEMENT FOR BLOCK SPAN REPLICATION".

U.S. patent application Ser. No. 11/470,539, by Dmitry Fomichev, entitled "REUSING TASK OBJECT AND RESOURCES".

BACKGROUND OF THE INVENTION

1. Technical Field

The present invention generally relates to scanning and reporting on storage resources. More particularly, the present invention relates to scanning and reporting on storage resources in a UNIX or UNIX derivative operating system computing environment.

2. Background Information

In UNIX, LINUX and other UNIX derivative operating systems, information about storage resources, such as type, size, manufacturer, serial number, etc., is scattered across various utilities, configuration and kernel access files. Each of the sources for obtaining the information also typically has its own format and protocol.

For example, the size of a physical storage resource in a UNIX or UNIX derivative environment can typically be found in at least three ways: sending a query to the operating system using a system service such as "ioctl," which will return the total number of blocks for the storage device; opening a special system file in the "/proc" directory tree and locating the storage device in the table; and sending a low-level query to the storage device itself, for example, issuing the SCSI command "READ_CAPACITY" or the ATA command "IDENTIFY."

This seemingly haphazard design for the location and accessing of storage resource information creates a challenge for, and results in more complex, storage management software in such environments.

Thus, a need exists for a simpler way to access storage resource information in UNIX and UNIX derivative operating system computing environments.

SUMMARY OF THE INVENTION

Briefly, the present invention satisfies the need for a simpler way to access storage resource information in UNIX and UNIX derivative operating system computing environments by providing a single point of reference for such information in a standard hierarchical format.

In accordance with the above, it is an object of the present invention to provide a way to access storage resource information in UNIX and UNIX derivative operating system computing environments.

The present invention provides a method of reliably completing a storage resource scan in a UNIX or UNIX derivative operating system computing environment. The method comprises initiating, by a resource scanner operating in a computing unit of the computing environment, at least one scan thread for a storage resource in the computing environment, the at least one scan thread being directed to information collection about the storage resource from at least one source within the computing environment. The method further comprises excluding by the resource scanner at least one of the at least one scan thread from scan results where execution is incomplete after a predetermined time, placing by the resource scanner the at least one of the at least one scan thread into a queue for continued execution until completion, and assembling by the resource scanner the collected information into a single file in a standard hierarchical format.

The present invention also provides systems and program products implementing the methods of the first and second aspects.

These, and other objects, features and advantages of this invention will become apparent from the following detailed description of the various aspects of the invention taken in conjunction with the accompanying drawings.

DETAILED DESCRIPTION OF THE INVENTION

In a UNIX or UNIX derivative operating system environment, different types of information about storage resources is obtained from various sources. This can be done, for example, in response to scan requests for storage resources. All information of the same type for a given resource that is gathered from multiple sources is analyzed for inconsistencies, and any inconsistencies are resolved in some fashion. All of the different types of information are placed in a single file in a standard hierarchical format.

Figure 1:
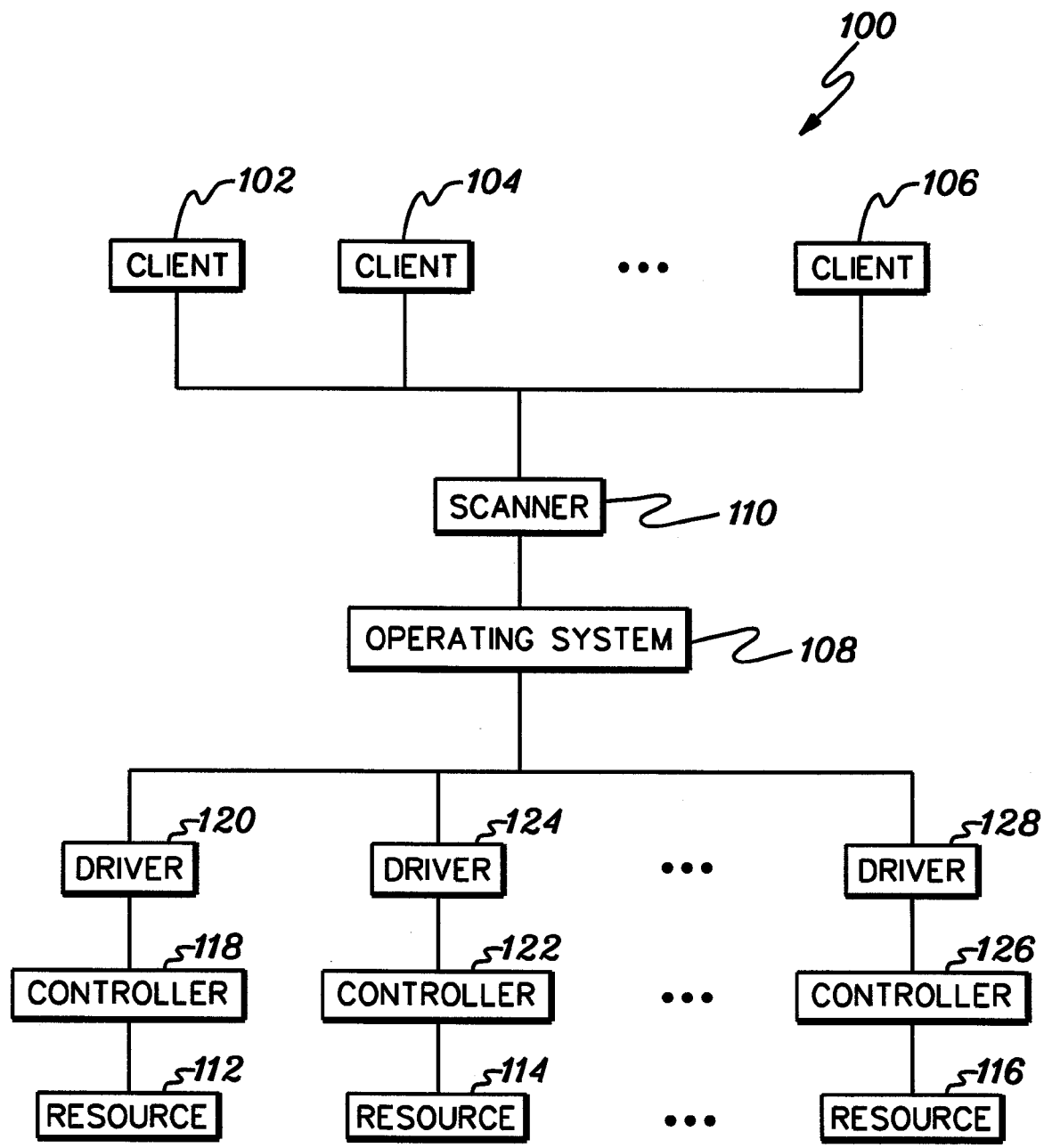
FIG. 1 is a block diagram of one example of a LINUX computing environment implementing the present invention.

FIG. 1 is a simplified block diagram of a computing environment 100 implementing the present invention. The environment comprises a network, for example, a local area network or wide area network. A plurality of clients, for example, clients 102, 104 and 106 exist on the network, and send various requests to an operating system 108 intended for a resource scanner 110. The clients are, for example, software modules requiring information about one or more storage resources, for example, storage resources 112, 114 and/or 116. Examples of such software modules include storage resource management software, and storage resource availability manager software. The clients can physically reside in one or more computing units or servers, either together or separately.

The operating system comprises, for example, UNIX or a UNIX derivative, for example, some form of LINUX. The resource scanner comprises, for example, a software server operating in accordance with the principles of the present invention, performing the client requests for information regarding the storage resources. There may be multiple scan threads for any given resource at any given time. Each storage resource has associated therewith a controller and driver. For example, controller 118 and driver 120 are associated with storage resource 112. The controllers control access to the resources, and the drivers, which may be software drivers residing in the operating system, facilitates the flow of data into and out of the associated storage resource.

One example of a method of providing storage resource information in accordance with the present invention will now be described with reference to the computing environment 100 of FIG. 1, in conjunction with a flow diagram 200 of FIG. 2. Assume that client 102 has requested information about storage resource 112. The request initially goes to operating system 108, which forwards it to scanner 110 for servicing. Scanner 110 then issues a request to controller 118. Depending on the type of information requested, the controller may have it, or may need to query resource 112 via driver 120.

Thus information is collected about a given storage resource (Step 202). Preferably, a given type of information is collected from at least one two different sources, when possible. In the present example, assume that the same information is also available through the operating system, which can be queried by the scanner. Where a given type of information collected from at least two sources, the information is preferably verified for consistency (Step 204). In the present example, the scanner compares the information to confirm its consistency from the two sources. Where inconsistencies exist (atypical), it usually signifies some type of failure of some entity in the process, frequently the controller or storage resource. In such a situation, either the scan is restarted, or the resource is declared as failed. The information is then assembled into a single file in a hierarchical standard format (Step 206). In the present example, the scanner adds the information to an XML file, which may then be accessed by client 102. In this way, there is a single point of standardized access to the information.

The types of information available for a given storage resource varies depending on the resource. Generally, the different types of information available include, for example, type, model number, vendor name, size, manufacturer's unique ID, serial number, system name for the storage resource, whether the storage resource is enabled or disabled, and some details regarding the information on the storage resource, such as, for example, file system label, virtual volume label, RAID super block, and partition table.

As noted above, the information is gathered and placed in a single file in a standard hierarchical format. Any hierarchical format now known or later developed can be used, so long as it has a flexible and extensible hierarchical data organization with hierarchically interconnected (e.g., nested) nodes (e.g., objects), each node having attributes or properties. A strong hierarchy allows for specifying multiple configurations and for easily introducing diverse nodes, without complicating the navigation of the file. Perhaps the best currently known example of such a hierarchical format, and the preferred format, is XML. Another example is the "ini" format, though well-known "tricks" to allow for nesting would need to be applied. For example, since the beginning of the next section is also the end of the previous, i.e., no breaks, nesting can be simulated by declaring subsections and paragraphs in the following manner [section-name.subsection-name.paragraph . . . ]. While the "ini" format is not preferred, and can quickly become unruly with nesting, in theory it could be used.

Figure 2:
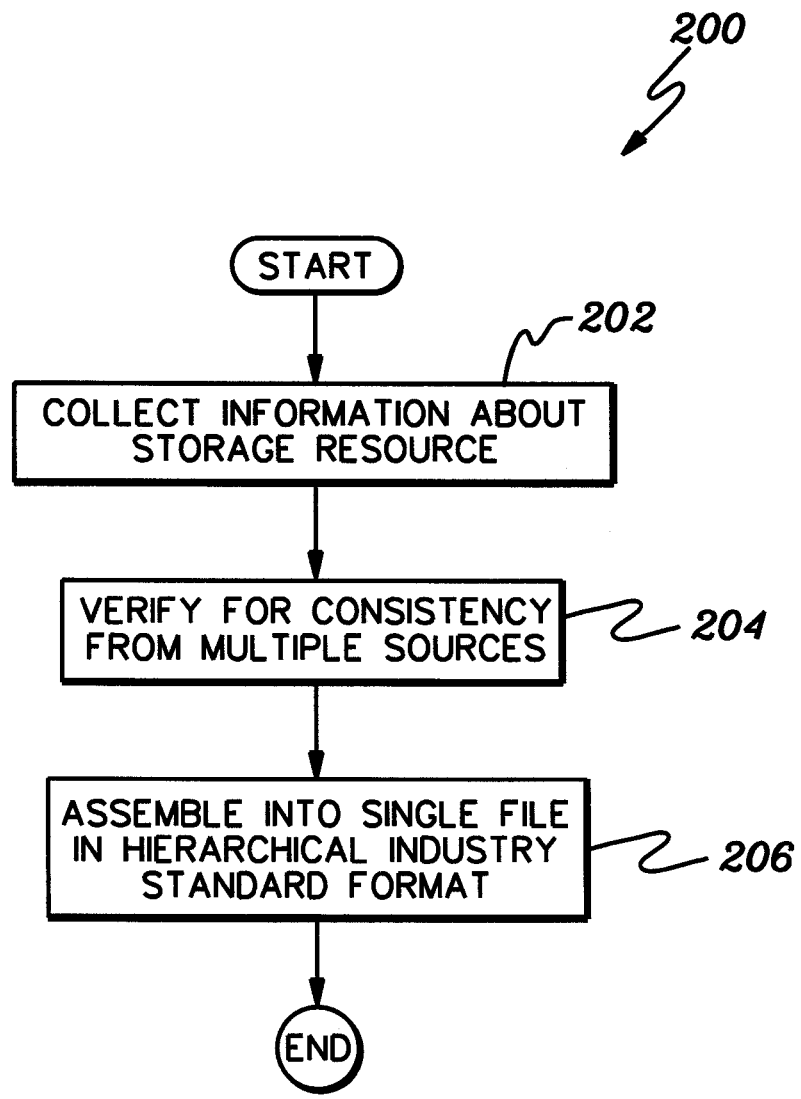
FIG. 2 is a flow diagram of one example of a method of the present invention.

In a variation of the method of FIG. 2, where at least two different types of information about a storage resource are requested, each of the types of information is preferably collected from at least two different sources, if possible. If only one source is available, then it need not be verified for consistency, but for a given type of information collected from at least two sources, the information is preferably verified for consistency. Inconsistencies are handled in the same manner. The information is then placed in a single file in a standard hierarchical format.

In another aspect of the present invention, a method of reliably completing a resource scan in a UNIX or UNIX derivative operating system computing environment where one or more resources may unexpectedly fail, is provided. Threads initiated for a scan request from clients are time-limited to achieve reliability in the completion of storage resource scans, such that a completion of a scan is based on time, not actual completion of all scan threads. The time limit can be blanket, regardless of the type of storage device, or it could be specific to the type of device. However, scan threads that do not complete in the predetermined time may be monitored and maintained in a queue.

Figure 3:
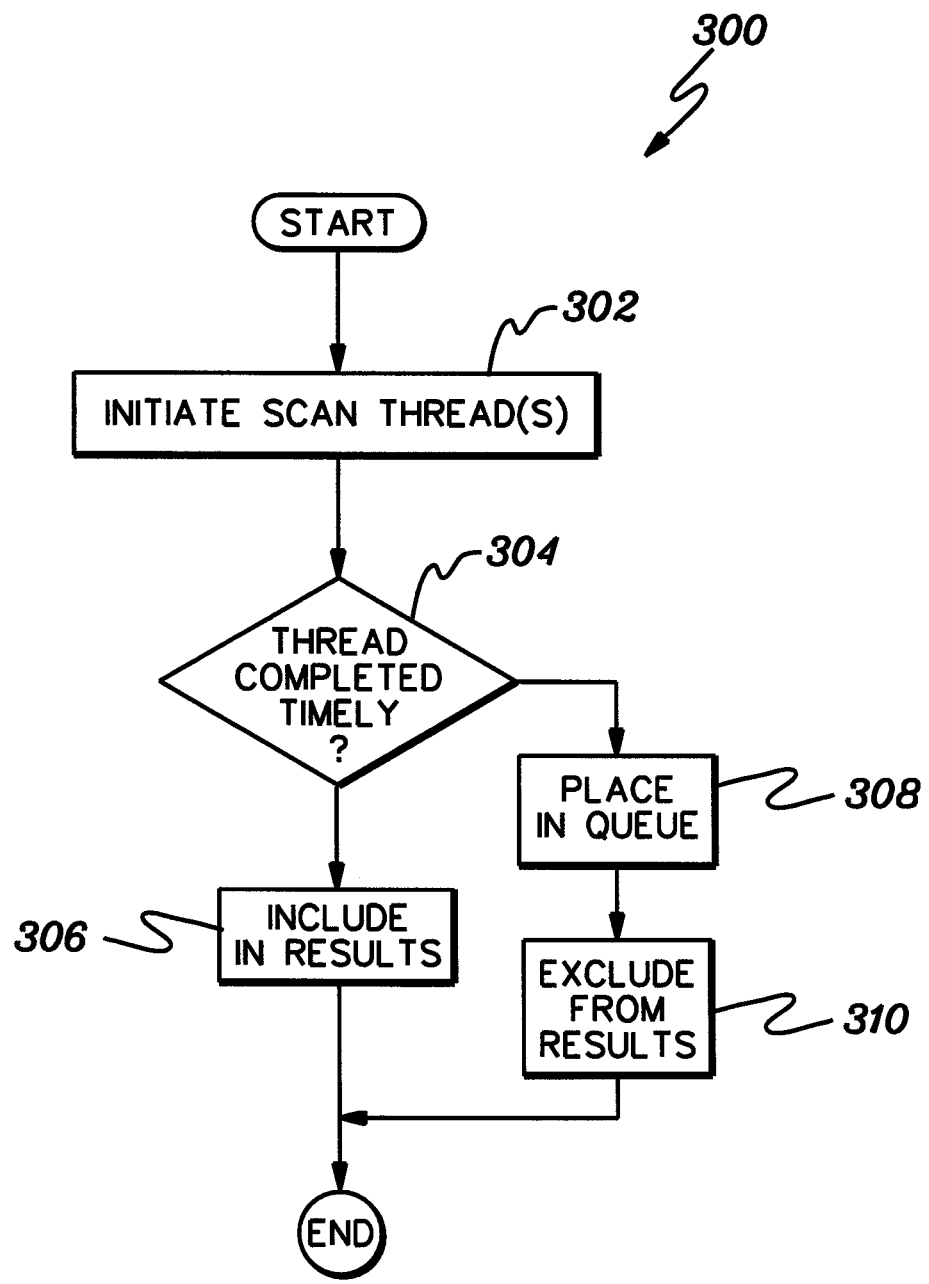
FIG. 3 is a flow diagram of another example of a method of the present invention.

The method will be described with reference to the flow diagram 300 of FIG. 3. One or more scan threads are initiated (Step 302). If a given scan thread has completed within a predetermined time (Inquiry 304), then it is included in the scan results. However, if it has not completed within the predetermined time, it is placed in a queue for further execution until completion (Step 308). In addition, the scan is excluded from the results, which otherwise proceeds normally (Step 310).

When a thread in the queue finishes, the normal sequence of events for an ending thread take place. The new scan results are preferably not provided to the originally requesting client, however, since the results without this information were already reported to the client. The new results may instead be used to determine whether a new scan should be initiated for the storage resource. For example, if the scan returns an error, then a new scan may be increasingly delayed until the resource recovers. No query is initiated for any resource with an active scan thread, or any resource with a scan returning an error. Examples of errors include a response time-out, an internal storage resource error, and block read error due to a damaged block or corrupt data. For resources returning such errors, scans may begin again, for example, with a new client request. However, resources returning a predetermined number of errors consecutively may be declared "deadbeat" and removed from potential scans.

The above-described computing environment and/or computing units are only offered as examples. The present invention can be incorporated and used with many types of computing units, computers, processors, nodes, systems, work stations and/or environments without departing from the spirit of the present invention.

The present invention can include at least one program storage device readable by a machine, tangibly embodying at least one program of instructions executable by the machine to perform the capabilities of the present invention. The program storage device can be provided separately, or as a part of a computing unit.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of reliably completing a storage resource scan in a UNIX or UNIX derivative operating system computing environment, the method comprising:
   initiating, by a resource scanner operating in a computing unit of the computing environment, at least one scan thread for a storage resource in the computing environment, wherein the at least one scan thread is directed to information collection about the storage resource from at least one source within the computing environment;
   excluding by the resource scanner at least one of the at least one scan thread from scan results where execution is incomplete after a predetermined time;
   placing by the resource scanner the at least one of the at least one scan thread into a queue for continued execution until completion; and
   assembling by the resource scanner the collected information into a single file in a standard hierarchical format.

2. The method of claim 1, wherein the at least one source comprises at least two different types of information about the storage resource.

3. The method of claim 2, wherein at least one of the at least two different types of information is collected from at least two different sources in the computing environment, the method further comprising verifying the collected information for consistency prior to the assembling.

4. The method of claim 2, wherein the assembling comprises assembling the collected information into a single XML file.

5. The method of claim 1, wherein the assembling comprises assembling the collected information into a single XML file.

6. The method of claim 1, wherein the at least one source comprises at least two different sources in the computing environment, the method further comprising verifying the collected information for consistency prior to the assembling.

7. The method of claim 1, further comprising determining by the resource scanner whether to rescan the storage resource based on new scan results including results of the at least one of the at least one scan thread.

8. The method of claim 1, further comprising receiving by the resource scanner a scan request for the storage resource prior to the initiating and excluding.

9. A system for reliably completing a storage resource scan in a UNIX or UNIX derivative operating system computing environment, the system comprising:
   a storage resource coupled to a UNIX or UNIX derivative operating system computing environment; and
   a resource scanner operating in a computing unit of the computing environment for:
      initiating at least one scan thread for the storage resource, wherein the at least one scan thread is directed to information collection about the storage resource from at least one source within the computing environment;
      excluding at least one of the at least one scan thread from scan results where execution is incomplete after a predetermined time;
      placing the at least one of the at least one scan thread into a queue for continued execution until completion; and
      assembling the collected information into a single file in a standard hierarchical format.

10. The system of claim 9, wherein the at least one source comprises at least two different types of information about the storage resource.

11. The system of claim 10, wherein at least one of the at least two different types of information is collected from at least two different sources in the computing environment, the resource scanner further operating to verify the collected information for consistency prior to the assembling.

12. The system of claim 10, wherein the single file comprises a single XML file.

13. The system of claim 9, wherein the assembling comprises assembling the collected information into a single XML file.

14. The system of claim 9, wherein the at least one source comprises at least two different sources in the computing environment, the resource scanner further operating to verify the collected information for consistency prior to the assembling.

15. The system of claim 9, wherein the resource scanner is also for determining whether to rescan the storage resource based on new scan results including results of the at least one of the at least one scan thread.

16. The system of claim 9, wherein the resource scanner is also for receiving a scan request for the storage resource prior to the initiating and excluding.

17. At least one non-transient program storage device readable by a machine tangibly embodying at least one program of instructions executable by the machine to perform a method of reliably completing a storage resource scan in a UNIX or UNIX derivative operating system computing environment, the method comprising:
   initiating by a resource scanner operating in a computing unit of the computing environment, at least one scan thread for a storage resource in the computing environment, wherein the at least one scan thread is directed to information collection about the storage resource from at least one source within the computing environment;
   excluding by the resource scanner at least one of the at least one scan thread from scan results where execution is incomplete after a predetermined time;
   placing by the resource scanner the at least one of the at least one scan thread into a queue for continued execution until completion; and
   assembling by the resource scanner the collected information into a single file in a standard hierarchical format.

18. The at least one program storage device of claim 17, wherein the at least one source comprises at least two different types of information about the storage resource.

19. The at least one program storage device of claim 18, wherein at least one of the at least two different types of information is collected from at least two different sources in the computing environment, the method further comprising verifying the collected information for consistency prior to the assembling.

20. The at least one program storage device of claim 18, wherein the assembling comprises assembling the collected information into a single XML file.

21. The at least one program storage device of claim 17, wherein the assembling comprises assembling the collected information into a single XML file.

22. The at least one program storage device of claim 17, wherein the at least one source comprises at least two different sources in the computing environment, the method further comprising verifying the collected information for consistency prior to the assembling.

23. The at least one program storage device of claim 17, further comprising determining by the resource scanner whether to rescan the storage resource based on new scan results including results of the at least one of the at least one scan thread.

24. The at least one program storage device of claim 17, further comprising receiving by the resource scanner a scan request for the storage resource prior to the initiating and excluding.

* * * * *